United States Patent [19]

Pugsley et al.

[11] Patent Number: 4,488,171
[45] Date of Patent: Dec. 11, 1984

[54] IMAGE REPRODUCTION

[75] Inventors: Peter C. Pugsley, Pinner; Leonard Preston, London, both of England

[73] Assignee: Crosfield Electronics Limited, London, England

[21] Appl. No.: 444,114

[22] Filed: Nov. 24, 1982

[30] Foreign Application Priority Data

Nov. 25, 1981 [GB] United Kingdom ............... 8135537

[51] Int. Cl.³ .......................................... H04N 1/46
[52] U.S. Cl. ...................................... 358/76; 358/78; 358/80
[58] Field of Search .......................... 358/76, 78, 80

[56] References Cited

U.S. PATENT DOCUMENTS 4,037,249 7/1977 Pugsley ............................... 358/76

FOREIGN PATENT DOCUMENTS 2719387 11/1978 Fed. Rep. of Germany ........ 358/76

Primary Examiner—Michael A. Masinick
Attorney, Agent, or Firm—Sughrue, Mion, Zinn, Macpeak and Seas

[57] ABSTRACT

In the reproduction of colored images, the "white point", that is to say a point which determines which areas are to be printed with zero-ink, is a critical adjustment. In this invention, signals representing the three color components derived from the original are applied to a NAND gate (14) and when all of these signals simultaneously represent a zero printing color condition, the NAND gate generates a zero-ink signal. This is used to modify the zero-ink or white display on the monitor tube, for example by inhibiting passage of red and blue signals (18R, 18B) to the display tube while allowing the passage of green signals. The green signal to the monitor tube may be periodically interrupted, so that zero-ink areas are shown in pulsating green. The operator then adjusts the white point until the pulsating green areas correspond to the areas of the original which are to be reproduced with zero-ink.

7 Claims, 1 Drawing Figure

IMAGE REPRODUCTION

BACKGROUND OF THE INVENTION

In the field of colour printing, image data is derived by scanning an image to derive a set of colour-component signals for each image pixel. Usually a black printer signal is derived from the colour-component signals and ideally the colour component signals are then reduced to take account of the contribution of the black printer signal. It is normal to store the signals before using them to control apparatus for making the colour separations.

It is known to display the stored image on a cathode ray tube forming part of a monitor and to modify the displayed image by altering for example its tone, colour balance and gradation; when a satisfactory displayed image is achieved, the modifications are applied to the stored data before that data is used to form images on the colour-separation films or plates.

SUMMARY OF THE INVENTION

The present invention is concerned with the correction of image data. One of the most critical adjustments which has to be made in preparing a picture for printing is that of the "white point" namely that point on the lightness scale of the original which corresponds to the transition between the white of the paper, and the first printing tone. By looking at the original, the printer judges which is the whitest area or areas, which will correspond to the "drop-out" on the printing plate, namely that portion which receives no ink at all.

The purpose of the present invention is to enable those areas of the stored image which will be printed with zero ink to be distinguished on a monitor display from other areas, e.g. areas in which the smallest amount of ink will be printed; a method according to the invention comprises deriving sets of electric signals representing colour components of the original, each set representing the appearance of an element of the original image, applying the said signals to a monitor, adjusting the signals until the image displayed on the monitor has a desired appearance, and thereafter using the adjusted signals to control the making of a reproduction of the original image, further comprising, for controlling the zero-ink areas in the reproduction of the image, the steps of: combining the signals of each set in a circuit which, when all of the signals simultaneously represent zero-printing colour for their respective colour components, provides a zero-ink recognition signal for the corresponding picture element; modifying each such recognised set of signals so that the corresponding areas of the image are shown on the monitor in a predetermined distinctive colour; adjusting the signals derived from the original to cause only those portions of the image for which the zero-ink condition is desired to be reproduced on the monitor in the said predetermined colour; and thereafter using the adjusted signals to control the making of the reproduction.

With a monitor of a kind which additively combines the colour represented by the colour-component signals, the modification of the recognised set of signals may take the form of suppressing one or more of the signals, so that the corresponding area is shown by the colour of the remaining signal or signals. Thus, drop-out (zero-ink) areas of the image can be made visible on a cathode ray tube monitor display by suppressing the red and blue signals so that these areas are shown in green.

If desired, to distinguish the areas which are represented by the said colour by virtue of the modification, from areas which are naturally of that colour, the former areas can be shown on the monitor in flashing or flickering light of the chosen colour.

Our attention has been drawn to British patent specification No. 1594569, which is concerned with drawing the attention of an operator to over-corrected areas of a display. It achieves this by passing the corrected ink-representing signals to an over-correction detector in which each of the corrected colour component signals is compared with upper and lower limits. If any of the signals is beyond a limit, the corresponding area of the display is made to flash and an indicator lamp indicates which colour component channel is suffering from the over-correction and whether the over-correction occurs at the high or low end of the colour component scale. Thus, in this disclosure the display will flash when any one of the colour component channels is over-corrected at either end of its scale; flashing due to a sub-threshold black printer signal, for example, may occur when signal values exists in at least two colour channels. Furthermore in many practical printing systems the black printer signal is below threshold up to mid-tone values of the image.

Apparatus embodying the invention comprises means for providing sets of signals representing the colour-components of the image, each set of signals representing the appearance of an element of the image, electronic means responsive to the said signals for detecting a set of signals having values indicative of an element which will have zero ink in the reproduction of the original, means for modifying at least one signal of each recognised set of signals, means applying the modified sets of signals to the monitor, whereby the corresponding areas of the image are displayed on the monitor in a predetermined colour, means for adjusting the signals representing the image in response to the display, so that only those portions of the image for which zero-ink reproduction is desired are displayed on the monitor in the said predetermined colour.

It will be appreciated that with this method and apparatus, the printer can readily compare the displayed areas with the whites of his original and can adjust his zero-ink point by methods which are well known and which do not form part of the present invention.

BRIEF DESCRIPTION OF THE DRAWING

The drawing shows an example of apparatus embodying the invention.

DESCRIPTION OF THE PREFERRED EMBODIMENT

Figure 1:
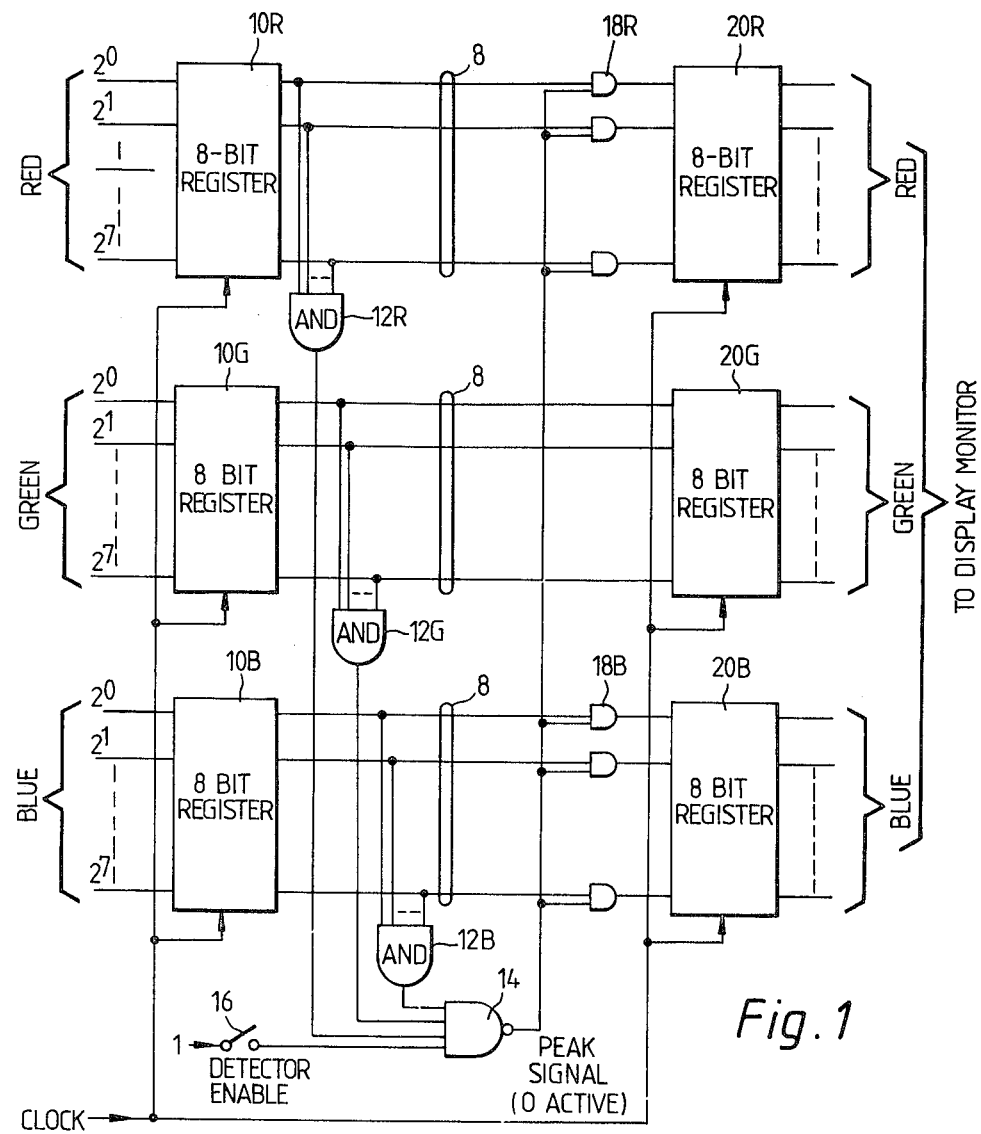

At the left-hand side of the drawing, there are three sets of input lines representing three colour channels along which pass signals derived from a store (not shown). Each channel provides an 8-bit input to a register, the registers being indicated as 10R, 10G and 10B. The eight outputs from each register pass in parallel to three respective AND gates 12R, 12G, and 12B. The outputs of these AND gates pass to a NAND gate 14, which also has a fourth input including a detector enable switch. The output of the NAND gate is zero only when all its inputs are 1; this corresponds to the drop-out or zero-ink state which it is desired to detect, and to the closure of the detector enable switch 16.

The output of the NAND gate 14 passes to 8 AND gates 18B in the blue channel and to a further 8 AND gates 18R in the red channel. There are no such gates in the green channel. The second inputs to each of the gates 18 in the blue and red channels are the eight-bit outputs of the register 10R and 10B.

In normal viewing mode, the detector enable switch 16 is open. Consequently, a logical 1 passes from the NAND gate 14 to the 8 AND gates 18 in the blue and red channels and the data outputs of the registers 10R and 10B pass through the gates 18 to further registers 20R and 20B. The signals from the green register 10G pass directly to the 8-bit register 20G.

When it is desired to display the zero-ink areas on the monitor screen, the detector enable switch 16 is closed. This applies a logical 1 value to the NAND gate 14 and when the 8 outputs of all three registers 10 have a logical 1 value, the outputs of the three AND gates 12R, 12G and 12B are all at 1. The NAND gate 14 then applies a zero input to the 16 AND gates 18. Consequently only the green signal passes to the display monitor. The colour which gives a 1 output on each of the 24 lines from the registers 10 is pure white. Therefore by observing the newly green areas of the screen and comparing them with the original, the printer can readily see the drop-out areas and can use his colour correction facilities interactively, the effect of which will be to increase or decrease the green areas viewed. If it is desired to make the drop-out area more distinguishable from areas of the image which are normally green, the drop-out green can be made to flash by passing the most significant bit of the green channel, the output of the NAND gate and a square wave of about one-half second period, to a further AND gate in the green channel.

We claim:

1. In a method of reproducing an original image, comprising deriving sets of electric signals representing color components of the original, each set representing the appearance of an element of the original image, applying the said signals to a monitor, adjusting the signals until the image displayed on the monitor has a desired appearance, and thereafter using the adjusted signals to control the making of a reproduction of the original image, further comprising, for controlling the zero-ink areas in the reproduction of the image, the steps of:

combining the signals of each set in a circuit which, when all of the signals simultaneously represent zero-printing color values for their respective color components, provides a zero-ink recognition signal for the corresponding picture element;

modifying each such recognised set of signals so that the corresponding areas of the image are shown on the monitor in a predetermined distinctive color;

adjusting the signals derived from the original to cause only those portions of the image for which the zero-ink condition is desired to be reproduced on the monitor in the said predetermined color;

and thereafter using the adjusted signals to control the making of the reproduction.

2. A method in accordance with claim 1, in which the monitor is of a kind which additively combines the colour components represented by the colour-component signals, further comprising the step of suppressing one or more of the signals of a set recognised as representing the zero-ink condition, whereby the corresponding area is shown by the colour of the remaining signal or signals.

3. A method in accordance with claim 1, in which the recognition of a set of signals is used to cause the corresponding area to be shown on the monitor in intermittent light of the chosen colour.

4. In image-signal processing apparatus, comprising means for providing sets of signals representing the colour components of the image, each set of signals representing the appearance of an element of the image, and a monitor for providing a display corresponding to the set of signals, the improvement consisting in:

electronic means responsive to the said signals for detecting a set of signals having values indicative of an element which will have zero ink in the reproduction of the original, means for modifying at least one signal of each recognised set of signals, means applying the modified sets of signals to the monitor, whereby the corresponding areas of the image are displayed on the monitor in a predetermined colour, means for adjusting the signals representing the image in response to the display, so that only those portions of the image for which zero-ink reproduction is desired are displayed on the monitor in the said predetermined colour.

5. Apparatus in accordance with claim 4, in which at the monitor the colours corresponding to the signals of a set are additively combined, the apparatus comprising means responsive to the detection of a set of signals corresponding to zero-ink reproduction to substitute a value corresponding to a high ink level for one or more of the signals of the set, whereby the corresponding area of the monitor display appears in the chosen colour or colours of high ink level.

6. Apparatus in accordance with claim 4, in which the monitor comprises a cathode ray tube as its display device.

7. Image-reproducing apparatus comprising image-signal processing apparatus in accordance with claim 4, in combination with means responsive to the adjusted signals to control the making of a reproduction of the image.

* * * * *